United States Patent [19]

Pham et al.

[11] Patent Number: 4,916,168

[45] Date of Patent: Apr. 10, 1990

[54] MANUFACTURE OF POLYURETHANE FOAM

[75] Inventors: Tu Pham, Grez-Doiceau; Louis Muller, Ottenburg, both of Belgium

[73] Assignee: Imperial Chemical Industries PLC, London, England

[21] Appl. No.: 247,453

[22] Filed: Sep. 21, 1988

[30] Foreign Application Priority Data

Sep. 21, 1987 [GB] United Kingdom ............... 8722149
Sep. 21, 1987 [GB] United Kingdom ............... 8722150
Aug. 22, 1988 [GB] United Kingdom ............... 8819880

[51] Int. Cl.⁴ .............................................. C08G 18/14
[52] U.S. Cl. ..................................... 521/167; 521/172; 521/173; 521/174; 521/176
[58] Field of Search ............... 521/167, 172, 173, 174, 521/176

[56] References Cited

U.S. PATENT DOCUMENTS 3,591,532  6/1971  Abercrombie et al. ............. 521/167

FOREIGN PATENT DOCUMENTS 164113     8/1982  Japan .
57-164114  8/1982  Japan .
57-164115  8/1982  Japan .

OTHER PUBLICATIONS

Patent Abstracts of Japan, vol. 7, No. 7 (C-144) [1552], Jan. 12, 1983.
FR-A-2181987 (Scott Paper) p. 5, line 1-p. 7, line 9; p. 10 lines 12-31; claim 1.
Journal of Cellular Plastics, vol. 20, No. 4, Jul./Aug. 1984, Technomic Publishing Co., Inc., C. J. Reichel et al: "Flexible Polyurethane Molded Foams Based on MDI" *p. 286, FIG. 3; p. 286, right-hand column, paragraph 2.

Primary Examiner—Maurice J. Welsh
Attorney, Agent, or Firm—Cushman, Darby & Cushman

[57] ABSTRACT

Flexible polyurethane foam based on methylene diphenyl isocyanates and isocyanate-reactive compounds selected from polyols and polyamines, for which the ratio of the density expressed in $kg/m^3$ to the compression hardness at 40% compression, expressed in kPa, has a value of at least 20.

Such foams may be obtained through a process which comprises reacting methylene diphenyl isocyanates with one or more isocyanate-reactive compounds selected from polyols and polyamines with a functionality of 2-4 and an average equivalent weight ranging from 750-5000 and from 0 to 5 parts by weight of water per 100 parts of polyols and/or polyamine, optionally together with additives conventional in the art, and optionally together with blowing agents other than water, whereas the isocyanate index ranges from 10 to 60.

10 Claims, No Drawings

MANUFACTURE OF POLYURETHANE FOAM

This invention relates to a process for manufacturing flexible foam products comprising urethane and/or urea linkages. More particularly the invention relates to a process for manufacturing such foam products in a one shot method which uses methylene diphenyl isocyanate (MDI) based isocyanates.

The manufacture of flexible polyurethane foam is a well known process. Its chemistry and technology have been reviewed in reference books such as the "Polyurethane Chemistry and Technology" by H. Saunders and K. C. Frisch, the "Polyurethane Handbook" by G. Oertel and the "Flexible Polyurethane Foams and Chemistry and Technology" by G. Woods.

The techniques described there are abundantly exploited industrially to produce flexible polyurethane foams for application in furniture, bedding, automotive, etc. Flexible polyurethane foams are generally produced by reacting polyols and polyisocyanates in the presence of water as carbon dioxide generator (isocyanate hydrolysis reaction). Halocarbon, such as chlorofluorocarbons (CFC), are often used as auxiliary blowing agents to supplement the blowing action of water. Tolylene-di-isocyanate (TDI) based isocyanates have long been applied as the preferred polyisocyanate. More recently however methylene-diphenyl-isocyanates (MDI) have also found application in the manufacture of flexible polyurethane foams. A reported advantage for the use of MDI over TDI is their lower vapour pressure which results in a safer use, from industrial hygiene point of view.

One limitation however of MDI-based systems has been considered to lie in their rather narrow range of commercially achievable properties, in particular in respect of density and hardness and also in their inability to produce low hardness (soft) foams without using auxiliary blowing agents beside or instead of water. Reference is made in this respect to publications by R. Volland (Journal of cellular plastics Nov.–Dec. 84, p. 416), by M. H. Courtney (proceedings of 30th SPI annual polyurethane technical and marketing meeting - p. 244) and R. C. Allen (proceedings of 30th annual SPI polyurethane technical and marketing meeting-p.256).

As there is a growing opposition to the use of CFC blowing agents this is clearly a serious drawback for MDI-based polyurethane flexible foams.

It has now been found surprisingly however that it is possible to produce foams based on MDI with a much broader range of properties, by performing the foaming process under the conditions defined hereinafter.

Accordingly the invention provides a process for manufacturing flexible polyurethane foams based on methylene diphenyl isocyanates and isocyanate-reactive compounds, which comprises reacting methylene diphenyl isocyanates with one or more isocyanate-reactive compounds selected from polyols and polyamines with a functionality of 2–4 and an average equivalent weight ranging from 750–5000 and from 0 to 5 parts by weight of water per 100 parts of polyols and/or polyamine, optionally together with additives conventional in the art, and optionally together with blowing agents other than water, whereas the isccyanate index ranges from 10 to 60.

According to an embodiment of the invention there is also provided a process for manufacturing flexible polyurethane foams based on methylene diphenyl isocyanates and isocyanate-reactive compounds, substantially avoiding halocarbon blowing agents, which comprises reacting methylene diphenyl isocyanates with water and one or more isocyanate-reactive compounds selected from polyols and polyamines with a functionality of 2–4 and an average equivalent weight ranging from 750–5000, optionally together with additives conventional in the art, whereas the isocyanate index ranges from 10 to below 60 and the weight ratio of the isocyanate-reactive compounds to water is at least 20.

The invention furthermore provides a new class of products, which can be defined as flexible polyurethane foams, preferably substantially water blown (or substantially halocarbon free) flexible polyurethane foams, based on methylene diphenyl isocyanates and isocyanate reactive compounds selected from polyols and polyamines, characterized by the fact that the ratio of the density expressed in $kg/m^3$ to the compression hardness at 40% compression, as measured according to the method described in ISO 3386, expressed in kPa has a value of at least 20.

In accordance with a certain trend in the art, the expression "polyurethane foam" as used herein generally refers to cellular products as obtained by reacting polyisocyanates with isocyanate-reactive hydrogen containing compounds, in the presence of foaming agents, and in particular includes cellular products obtained with water as reactive foaming agent (involving a reaction of water with isocyanate groups yielding urea linkages and carbon dioxide).

The expressions "isocyanate-reactive hydrogen containing compounds" or "isocyanate-reactive compounds" as used herein are furthermore intended to include polyols as well as polyamines. The expression "polyurethane foam" is thus intended also to include products which comprise urethane linkages together with urea linkages and even products which essentially comprise urea linkages with few or no urethane linkages.

The expression "flexible polyurethane foam" as used herein refers to cellular products which exhibit substantial shape recovery after deformation.

The expressions "methylene diphenyl isocyanates" and "MDI" as used herein refers to polyisocyanate compositions comprising compounds selected from diphenylmethane diisocyanate isomers, polyphenyl polymethylene polyisocyanates and derivatives thereof bearing at least two isocyanate groups and containing carbodiimide groups, uretonimine groups, isocyanurate groups, urethane groups, allophanate groups, urea groups or biuret groups.

Methylenediphenyl isocyanates as thus defined are obtainable by condensing aniline with formaldehyde, followed by phosgenation, which process yields what is called crude MDI, by fractionation of said crude MDI, which process yields pure MDI and polymeric MDI, and by autocondensation of crude, pure or polymeric MDI, or reaction of excess of crude, pure or polymeric MDI with polyols or polyamines, which processes yield modified MDI, containing respectively carbodiimide, uretonimine, isocyanurate, allophanate or biuret groups and urethane or urea groups.

Thus the expression methylene diphenyl isocyanates as used herein is intended to encompass isocyanate bearing compounds sometimes referred to in the art as quasi-prepolymers or semi-prepolymers based on MDI, which in fact correspond to the modified MDI containing urethane and/or urea groups as defined above.

The expression substantially avoiding halocarbon blowing agents as used herein means that the compositions referred to contain at most such low levels of halocarbon blowing agents, as for instance chlorofluorocarbons (or CFC's), that the blowing due to said halocarbon blowing agents is less than 10% of the total foaming of the reactive formulation. Thus in particular the expression substantially avoiding halocarbon blowing agents means that the total formulation used in a process contains less than 1%, and more specifically less than 0,5% by weight of halocarbon blowing agent.

The expression "additives conventional in the art" as used herein refers to such optional or desirable ingredients as known in the art of flexible polyurethane foams, as more in particular reported in chapter 2 of the reference book "Flexible Polyurethane Foams" by George Woods, edited by Applied Science Publishers, the disclosure of which is incorporated herein by reference.

Thus the expression additives conventional in the art is in particular intended to include catalysts, chain-extending agents, cross-linking agents, curing agents, blowing agents, surfactants, fillers, fibrous reinforcements and flame retardants.

The expressions "isocyanate index" and "NCO-index" as used herein refer to the ratio of -NCO groups over reactive hydrogen atoms present in a polyurethane formulation, given as a percentage:

$$NCO\text{-index} = \frac{[NCO]}{[\text{active hydrogen}]} \times 100$$

In other words the NCO-index expresses the percentage of isocyanate actually used in a formulation with respect to the amount of isocyanate theoretically required for reacting with the amount of isocyanate reactive hydrogen used in a formulation.

The expression "active hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index one hydroxyl group is considered to comprise one reactive hydrogen, one primary amine group is considered to comprise two reactive hydrogens and one water molecule is considered to comprise two active hydrogens.

It should be observed that the isocyanate index as used herein is considered from the point of view of the actual foaming process involving the MDI ingredient, the polyol and/or polyamine ingredient and the water, regarded as a one shot system.

Any isocyanate groups consumed in a preliminary step to produce modified MDI (including such MDI-derivatives referred to in the art as quasi- or semi-prepolymers) or any active hydrogens reacted with isocyanate to produce modified polyols or polyamines, are not taken into account in the calculation of the isocyanate index. Only the free isocyanate groups and the free active hydrogens (including those of the water) present at the actual foaming process are taken into account.

The expression "one shot" method, process or system as used herein therefore refers to such processes where the MDI ingredient, the polyol and polyamine ingredient and the water are reacted with each other, excluding the so called prepolymer method in which MDI ingredients are pre-reacted with all polyol and polyamine ingredients, whereas the obtained product, possibly with additional MDI, is finally foamed with the water, but including so called semi- or quasi-prepolymer systems where some polyol and/or polyamine has been incorporated into the MDI ingredient.

The expressions "foam density" and "density" as used herein when referring to flexible polyurethane foams, relate, for the purpose of clear definition, to the density as would be measured on a foam sample obtained by foaming under free rise conditions, as opposed to foaming under vacuum or in a closed mould.

The process of the invention is however not limited to such free rise conditions and in particular the process can for example be used for slabstock manufacture as well as for molding and vacuum foaming.

Methylene diphenyl isocyanates which can be employed in accordance with the invention include for example:

(a) diphenylmethane-4,4'-diisocyanate and mixtures thereof with other isomers of of iphenylmethane diisocyanate;

(b) methylene bridged polyphenylpolyisocyanates prepared by phosgenation of mixtures of polyamines obtained by the condensation of aniline and formaldehyde and known in the art as "crude" or "polymeric MDI";

(c) polymers and oligomers obtained by reacting diphenylmethane diisocyanates or "crude MDI" with an isocyanate reactive compound, such as for example a monomeric glycol or polyol (or mixtures thereof) or a hydroxyl-ended polyester or polyether; such polymers and oligomers known in the art as "MDI prepolymers"; and (d) modified diphenylmethane diisocyanates or "crude MDI" in which a proportion of the isocyanate groups are converted into other functional groups such as carbodiimide, isocyanurate, uretonimine or allophanate groups, or in which a proportion of the isocyanate groups are reacted with an isocyanate-reactive compound.

The NCO-functionality of the used methylene diphenyl isocyanates preferably ranges from 1.9 to 2.9 and most preferably from 2 to 2.5.

Mixtures of MDI variants may also be used if desired.

Isocyanate reactive hydrogen containing compounds for use in accordance with the invention are selected from polyols and polyamines with a functionality of 2–4 and an average equivalent weight ranging from 750–5000, preferably from 1000 to 3000.

Suitable polyols which can be employed include for example those polyether and polyester polyols which have an average hydroxyl functionality from 2 to 4, and preferably from 2 to 3, and an average hydroxyl equivalent weight of from 750 to 5000 preferably from 1000 to 3000 and most preferably from 1000 to 2500.

Further polyols which may be employed include for example polythioethers, polyacetals, polycarbonates and polyesteramides comprising from 2 to 4, and preferably from 2 to 3 hydroxyl groups.

Suitable polyamines which can be employed include for example those polyether polyamines which have an average amine functionality from 2 to 4, and preferably from 2 to 3, and an average hydroxyl equivalent weight from 750 to 5000, preferably from 1000 to 3000 and most preferably from 100 to 2500.

Suitable polyether polyols which can be employed include those which are prepared by reaching one or more alkylene oxides or substituted alkylene oxides with one or more active hydrogen containing initiators compounds. Suitable such oxides include for example ethylene oxide, propylene oxide, tetrahydrofuran, butylene oxides, styrene oxide, epichlorhydrin and epibromhydrin.

Suitable initiator compounds include, for example, water ethylene glycol, propylene glycol, butane diol, hexane diol, glycerol, trimethylol propane, pentaerythritol, hexanetriol, hydroquinone, resorcinol, catechol, bisphenols, novolac resins, phosphoric acid.

Further suitable initiators include, for example, ammonia, ethylenediamine, diaminopropanes, diaminobutanes, diaminopentanes, diaminohexanes, ethanolamine, aminoethylethanolamine, aniline, 2,4-toluenediamine, 2,6-toluenediamine, 2,4'-diamino-diphenylmethane, 4,4'-diaminodiphenylmethane, 1,3-phenylenediamine, 1,4-phenylenediamine, naphthylene-1,5-diamine, 4,4'-di(methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene and 3,5,3',5'-tetraethyl-4,4'-diaminodiphenylmethane.

Suitable polyester polyols which can be employed include, for example, those prepared by reacting one or more polycarboxylic acids or anhydrides or esters thereof with one or more polyhydric alcohols. The polycarboxylic acids may be aliphatic, cycloaliphatic, aromatic and/or heterocyclic and may be substituted (e.g. with halogen) and/or unsaturated. Examples of carboxylic acids of this kind include glutaric acid, succinic acid, adipic acid, suberic acid, azelaic acid, sebacic acid, phthalic acid, isophthalic acid, trimellitic acid, tetrahydrophthalic acid, hexahydrophthalic acid, tetrachlorophthalic acid, maleic acid, fumaric acid, dimeric and trimeric fatty acids, which may be in admixture with monomeric fatty acids, terephthalic acid, and the like.

Examples of suitable polyhydric alcohols include ethylene glycol; 1,2-propylene glycol; 1,3-propylene glycol; butylene glycols; 1,6-hexane diol; 1,8-octane diol; neopentyl glycol; cyclohexane dimethanol (1,4-bis-hydroxymethyl cyclohexane); 2-methyl-1,3-propane diol; glycerol; trimethylol propane; 1,2,6-hexane triol; 1,2,4-butane triol; trimethylol ethane; pentaerythritol; quinitol; diethylene glycol; triethylene glycol; tetraethylene glycol; polyethylene glycol; dipropylene glycol; polypropylene glycols; dibutylene glycol; or polybutylene glycols. It is also possible to use polyesters of lactones such as caprolactone, or hydroxy carboxylic acids such as hydroxy caproic acid.

Suitable polyether polyamines which can be employed include those which are prepared by amination of polyether polyols of the type described above.

For use in accordance with the invention it is not necessary that the amination of the polyols be complete. Partially aminated polyether polyols of the type disclosed above can also be employed.

Other suitable polyol compositions which can be used include for example polyhydroxyl derivatives which contain high molecular polyaddition or polycondensation polymers in dispersed or soluble state. Such polyhydroxyl derivatives can for example be obtained by carrying out polyaddition reaction (for instance between polyisocyanates and amino-functional compounds) or a polycondensation reaction (for instance between formaldehyde and phenols and/or amines) in situ in such polyols as already disclosed above. Suitable are also polyhydroxyl derivative modified by vinylpolymerization, such as for example obtained by polymerizing styrene and acrylonitrile in the presence of polyether polyols or polycarbonate polyols.

In the process according to the invention the isocyanate index as defined above should rang from 10 to 60 and preferably from 20 to below 60.

According to one embodiment of the invention this specific range of isocyanate index is associated with the use of halocarbon blowing agents to provide polyurethane foams with particular properties.

According to another embodiment of the invention the above specific range of isocyanate index is associated with the use of water, in various ranges of water to polyol and polyamine proportions.

Thus an isocyanate index ranging from 10 to 60, preferably from 20 to 60, may be used together with a proportion of 0.5 to 5% by weight of water with respect to the polyols and polyamines. Alternatively an isocyanate index ranging from 10 to 60, preferably from 20 to 60 may be used together with less than 0.5% of water with respect to the polyols and polyamines.

As indicated above, the process according to the invention leads to foamed products which were not accessible before, i.e. MDI-based polyurethane flexible foams, preferably substantially water blown (or halocarbon free) MDI-based polyurethane flexible foams, which are characterized by the fact that the ratio of the free rise density expressed in $kg/m^3$ to the compression hardness at 40% compression, as measured according to the method described in ISO 3386, expressed in kPa, has a value of at least 20.

It is a further object of the invention to provide such new foamed products having in particular a density above 45 $kg/m^3$, preferably above 50 $kg/m^3$, most preferably from 50 to 200 $kg/m^3$.

It is another object of the invention to provide a new class of products characterized as MDI-based polyurethane flexible foams, preferably substantially water blown (or halocarbon free) MDI-based polyurethane flexible foams, having a compression hardness at 40% compression, as measured according to the method described in ISO 3386, below 2.5 kpa, preferably below 2.0 kPa and most preferably below 1.0 kpa.

The present invention further also cover polyurethane systems suitable for performing the process of the invention. The expression "system" as used herein refers to a set of individual components which are produced and/or marketed with the obvious purpose to be suitable for use in combination with each other to perform a specific process or to achieve specific performances.

Thus, the invention covers a reactive system for the manufacture of flexible polyurethane foams involving an isocyanate composition based on methylene diphenyl isocyanates and an isocyanate reactive composition comprising one or more polyols and/or polyamines with a functionality of 2-4 and an average equivalent weight ranging from 750-5000 and from 0 to 5 parts by weight of water per 100 parts of polyol and polyamine, optionally together with additives conventional in the art and/or with blowing agents other than water, said isocyanate composition and isocyanate reactive composition being provided in proportions to give an isocyanate index ranging from 10 to 60.

Thus also, the invention covers a reactive system for the manufacture of soft flexible polyurethane foams involving a substantially halocarbon free isocyanate composition based in methylene diphenyl isocyanates and a substantially halocarbon free isocyanate reactive composition comprising one or more polyols and/or polyamines with a functionality of 2-4 and an average equivalent weight ranging from 750-5000 and from 0.5 to 5 parts by weight of water per 100 parts of polyol and polyamine, optionally together with additives conventional in the art, said isocyanate composition an isocyanate reactive composition being provided in proportions to give an isocyanate index ranging from 10 to 60.

The invention also covers polyurethane formulations suitable for performing the process of the invention. The expression "formulation" as used herein refers to a written or verbal disclosure reciting individual ingredients in the appropriate proportions to be capable to perform a specific process or to achieve specific performances.

Thus, the invention covers any direct or indirect, written or verbal incitation to manufacture flexible polyurethane foams using isocyanate composition based on methylene diphenyl isocyanates and an isocyanate reactive composition comprising one or more polyols and/or polyamines with a functionality of 2-4 and an average equivalent weight ranging from 750-5000 and from 0 to 5 parts by weight of water per 100 parts of polyol and polyamine, optionally together with additives conventional in the art and/or with blowing agents other than water, said isocyanate composition and isocyanate reactive composition being provided in proportions to give an isocyanate index ranging from 10 to 60.

Thus also, the invention covers any direct or indirect, written or verbal incitation to manufacture flexible polyrrethane foams using a substantially halocarbon free isocyanate composition based in methylene diphenyl isocyanates and a substantially halocarbon free isocyanate reactive composition comprising one or more polyols and/or polyamines with a functionality of 2-4 and an average equivalent weight ranging from 750-5000 and from 0.5 to 5 parts by weight of water per 100 parts of polyol and polyamine, optionally together with additives conventional in the art, said isocyanate composition and isocyanate reactive composition being provided in proportions to give an isocyanate index ranging from 10 to 60.

The manufacture of flexible foams in accordance with the present invention may be performed using techniques well known in the art and abundantly commented in the reference books referred to more above. Thus the process can be performed in conventional ways as free rise method or as moulding method, and may be used to manufacture moulded foams as well as slabstock, either by a continuous or by a discontinuous process.

The invention is illustrated but not limited by the following examples.

In these examples the following hand mix procedure has been followed. The isocyanate-reactive compound, the water and additives were premixed for 15 seconds at 1500 RPM. The isocyanate was then added, with a further 5 second mixing at 2000 RPM. The mixtures were poured in 5 liter polyethylene buckets. The foam was allowed to cure for 24 hours. Pads of $10 \times 10 \times 5$ cm were then cut from the center of the bun for physical testing.

In the formulations listed herebelow the following references are used to designate the various components:

I-R designates the isocyanate reactive compound(s) according to the definition given above
C designates catalyst component(s)
C-L designates cross-linker component(s)
S designates stabiliser component(s) and
ISO designates the isocyanate component(s).

EXAMPLE 1

| I-R | Daltocel T-3275 (from ICI) | 100 pbw |
|---|---|---|
| S | Tegostab B 4113 (from Goldschmidt) | 0.3 pbw |
| C | Dabco 33LV (from Air Products) | 0.7 pbw |
| C | Dimethylaminopropylamine | 0.35 pbw |
| C | Dimethylethanolamine | 0.40 pbw |
|  | Water | 3.0 pbw |
| ISO | Suprasec VM 28 (from ICI) (2) | 34.0 pbw |

The isocyanate index was 50.
The cured foam had a density of 62 kg/m$^3$.
The compression hardness at 40% compression (CV40), as measured according to the method described in ISO 3386 had a value of 0.95 kPa.

EXAMPLE 2

| I-R | Daltorez RL (from ICI) (3) | 100 pbw |
|---|---|---|
| C | Dabco 33LV (from Air Products) | 0.2 pbw |
| C | Niax Al (from Union Carbide) | 0.1 pbw |
| C | Stannous Octoate | 0.2 pbw |
| S | Tegostab 2370 (from Goldschmidt) | 1.0 pbw |
|  | Water | 5.0 pbw |
| ISO | 50/50 mixture of Suprasec DNR and Uropol DP 980 (from ICI) (4) | 49 pbw |

The isocyanate index was 53.
The cured foam had a density of 75 kg/m$^3$.
The compression hardness at 40% compression (CV40) as measured according to the method described in ISO 3386 had a value of 2.7 kPa.

(1) Daltocel T-3275 is a polyether polyol with a OH-value of 32.
(2) Suprasec VM 28 is a modified polymeric MDI with free NCO-content of 25%.
(3) Daltorez TL is a polyester polyol with a OH-value of 45.
(4) Suprasec DNR is crude MDI with a —NCO functionality of 2.7.
Uropol DP 980 is a polyester modified MDI with a -NCO functionality of 2.

I claim:

1. Process for manufacturing flexible polyurethane foams based on methylene diphenyl isocyanates and isocyanate-reactive compounds, which comprises reacting methylene diphenyl isocyanates with one or more isocyanate-reactive compounds selected from polyols and polyamines with a functionality of 2-4 and an average equivalent weight ranging from 750-5000 and from 0 to 5 parts by weight of water per 100 parts of polyols and/or polyamine, optionally together with additives conventional in the art, and optionally together with blowing agents other than water, whereas the isocyanate index ranges from 10 to 60.

2. Process for manufacturing flexible polyurethane foams based on methylene diphenyl isocyanates and isocyanate-reactive compounds, substantially avoiding halocarbon blowing agents, which comprises reacting methylene diphenyl isocyanates with water and one or more isocyanate-reactive compounds selected from polyols and polyamines with a functionality of 2-4 and an average equivalent weight ranging from 750-5000, optionally together with additives conventional in the art, whereas the isocyanate index ranges from 10 to below 60 and the weight ratio of the isocyanate-reactive compounds to water is at least 20.

3. Process according to claim 2 characterized in that the weight ratio of the isocyanate-reactive compounds to water ranges from 20 to 200.

4. Process according to any one of the preceding claims, characterized in that one or more isocyanate-reactive compounds are selected from polyether polyols, polyester polyols and polyether polyamines.

5. Flexible polyurethane foam based o methylene diphenyl isocyanates and isocyanate-reactive compounds selected from polyols and polyamines, characterized by the fact that the ratio of the density expressed in $kg/m^3$ to the compression hardness at 40% compression, as measured according to the method described in ISO 3386, expressed in kPa, has a value of at least 20.

6. Flexible polyurethane foam based on methylene diphenyl isocyanates and isocyanate reactive compounds selected from polyols and polyamines, characterized by a compression hardness at 40% compression, as measured according to the method described in ISO 3386, of less than 2.5 kPa.

7. Flexible polyurethane foam according to claim 5 or 6, characterized in that it is substantially water blown.

8. Flexible polyurethane foam according to any one of claims 5 to 6, obtained by a one-shot process.

9. Reactive system for the manufacture of flexible polyurethane foams involving an isocyanate composition based on methylene diphenyl isocyanates and an isocyanate reactive composition comprising one or more polyols and/or polyamines with a functionality of 2-4 and an average equivalent weight ranging from 750-5000 and from 0 to 5 parts by weight of water per 100 parts of polyol and polyamine, optically together with additives conventional in the art and/or with blowing agents other than water, said isocyanate composition and isocyanate reactive composition being provided in proportions to give an isocyanate index ranging from 10 to 60.

10. Polyurethane foam formulation inciting to manufacture flexible polyurethane foams using an isocyanate composition based on methylene diphenyl isocyanates and an isocyanate reactive composition comprising one or more polyols and/or polyamines with a functionality of 2-4 and an average equivalent weight ranging from 750-5000 and from 0 to 5 parts by weight of water per 100 parts of polyol and polyamine, optically together with additives conventional in the art and/or with blowing agents other than water, said isocyanate composition and isocyanate reactive composition being provided in proportions to give an isocyanate index ranging from 10 to 60.

* * * * *